US012561256B2

(12) United States Patent
Jaquette et al.

(10) Patent No.: US 12,561,256 B2
(45) Date of Patent: Feb. 24, 2026

(54) PROCESSING AND ARCHIVING ENCRYPTED DATA AT SHARED STORAGE LOCATIONS

(71) Applicant: International Business Machines Corporation, Armonk, NY (US)

(72) Inventors: Glen Alan Jaquette, Tucson, AZ (US); Rahul M. Fiske, Pune (IN); Ashish Jagdale, Pune (IN); Mohit Chitlange, Pune (IN)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 18/222,274

(22) Filed: Jul. 14, 2023

(65) Prior Publication Data

US 2025/0021490 A1      Jan. 16, 2025

(51) Int. Cl.
*H04L 9/08* (2006.01)
*G06F 12/14* (2006.01)
*H04L 9/32* (2006.01)

(52) U.S. Cl.
CPC ........ *G06F 12/1408* (2013.01); *H04L 9/3242* (2013.01); *G06F 2212/1052* (2013.01)

(58) Field of Classification Search
CPC ......... G06F 12/1408; G06F 2212/1052; H04L 9/3242
USPC ........................................................ 713/193
See application file for complete search history.

(56) References Cited

U.S. PATENT DOCUMENTS

| | | | |
|---|---|---|---|
| 8,117,464 B1 | 2/2012 | Kogelnik | |
| 8,798,262 B1* | 8/2014 | Raizen | G06F 21/78 726/21 |
| 9,160,526 B1* | 10/2015 | Raizen | H04L 9/08 |
| 9,395,929 B2* | 7/2016 | Bojinov | G06F 11/1453 |
| 10,078,459 B1 | 9/2018 | Natanzon et al. | |
| 10,114,831 B2 | 10/2018 | VanderSpek et al. | |
| 10,498,356 B2 | 12/2019 | Hecker et al. | |
| 10,915,382 B2 | 2/2021 | Zhang et al. | |
| 11,128,460 B2* | 9/2021 | Perlman | H04L 9/0894 |
| 11,256,433 B2* | 2/2022 | Narayanamurthy | H04L 9/0894 |
| 11,308,035 B2 | 4/2022 | Prahlad et al. | |
| 11,403,019 B2* | 8/2022 | Nagle | G06F 3/0608 |

(Continued)

OTHER PUBLICATIONS

Mark W. Storer; Secure Data Deduplication; ACM:2008; pp. 1-10.*

(Continued)

*Primary Examiner* — Monjur Rahim
(74) *Attorney, Agent, or Firm* — Zilka-Kotab, P.C.

(57) ABSTRACT

A computer-implemented method, according to one embodiment, includes: receiving encrypted data at a storage controller, and providing the encrypted data to a secure software container. The secure software container is configured to decrypt the encrypted data, calculate hash values using the decrypted data, and compress the decrypted data. The secure software container is also configured to re-encrypt the decrypted data. The computer-implemented method also includes receiving a new copy of the encrypted data from the secure software container. The new copy of the encrypted data may be compressed, include hash values calculated at the secure software container, or compressed as well as including hash values. The new copy of the encrypted data received may thereby be stored in memory.

20 Claims, 5 Drawing Sheets

(56) References Cited

U.S. PATENT DOCUMENTS

| | | | | |
|---|---|---|---|---|
| 2007/0116266 | A1* | 5/2007 | Greco | H04L 9/3236 |
| | | | | 380/28 |
| 2016/0330180 | A1* | 11/2016 | Egorov | G09C 1/00 |
| 2018/0034787 | A1* | 2/2018 | Kamaraju | H04L 63/0435 |
| 2018/0364917 | A1* | 12/2018 | Ki | G06F 3/068 |
| 2019/0065788 | A1* | 2/2019 | Vijayasankar | G06F 3/064 |
| 2019/0196731 | A1* | 6/2019 | Sapuntzakis | G06F 3/0608 |
| 2020/0134202 | A1* | 4/2020 | Sapuntzakis | H04L 9/0891 |
| 2020/0293212 | A1* | 9/2020 | Narayanamurthy | H04L 9/0894 |
| 2021/0173945 | A1* | 6/2021 | Karr | G06F 3/065 |
| 2021/0224379 | A1 | 7/2021 | Pientka et al. | |
| 2022/0138159 | A1 | 5/2022 | Natanzon et al. | |
| 2022/0222345 | A1 | 7/2022 | Mueller-Wicke et al. | |
| 2023/0198757 | A1* | 6/2023 | Sapuntzakis | H04L 9/3297 |
| | | | | 380/277 |
| 2024/0086335 | A1* | 3/2024 | Kaufman | G06F 3/0641 |
| 2024/0089239 | A1* | 3/2024 | Kakaiya | H04L 9/0897 |
| 2024/0361936 | A1* | 10/2024 | Kaufman | G06F 3/0641 |

OTHER PUBLICATIONS

Anonymous, "Method to avoid re-encryption of data in deduplication enabled storage controllers," IP.com Prior Art Database Technical Disclosure No. IPCOM000260404D, Nov. 19, 2019, 6 pages.

Verizon, "Results and Analysis," Verizon, 2021, 6 pages, retrieved from https://www.verizon.com/business/resources/reports/dbir/2021/results-and-analysis/.

Kime, C., "The Data Deduplication Market," Datamation, Feb. 24, 2022, 6 pages, retrieved from https://www.datamation.com/big-data/data-deduplication-market/.

SNIA, "Computational Storage Architecture and Programming Model," SNIA Standard, Aug. 30, 2022, 3 pages, retrieved from https://www.snia.org/standards/technology-standards-software/standards-portfolio/computational-storage-architecture-and.

Rubrik, "Rubrik Delivers Cyber Threat Hunting in Battle Against Ransomware," Rubrik, press Release, Dec. 7, 2021, 6 pages, retrieved from https://www.rubrik.com/company/newsroom/press-releases/21/rubrik-delivers-cyber-threat-hunting-in-battle-against-ransomware.

* cited by examiner

100

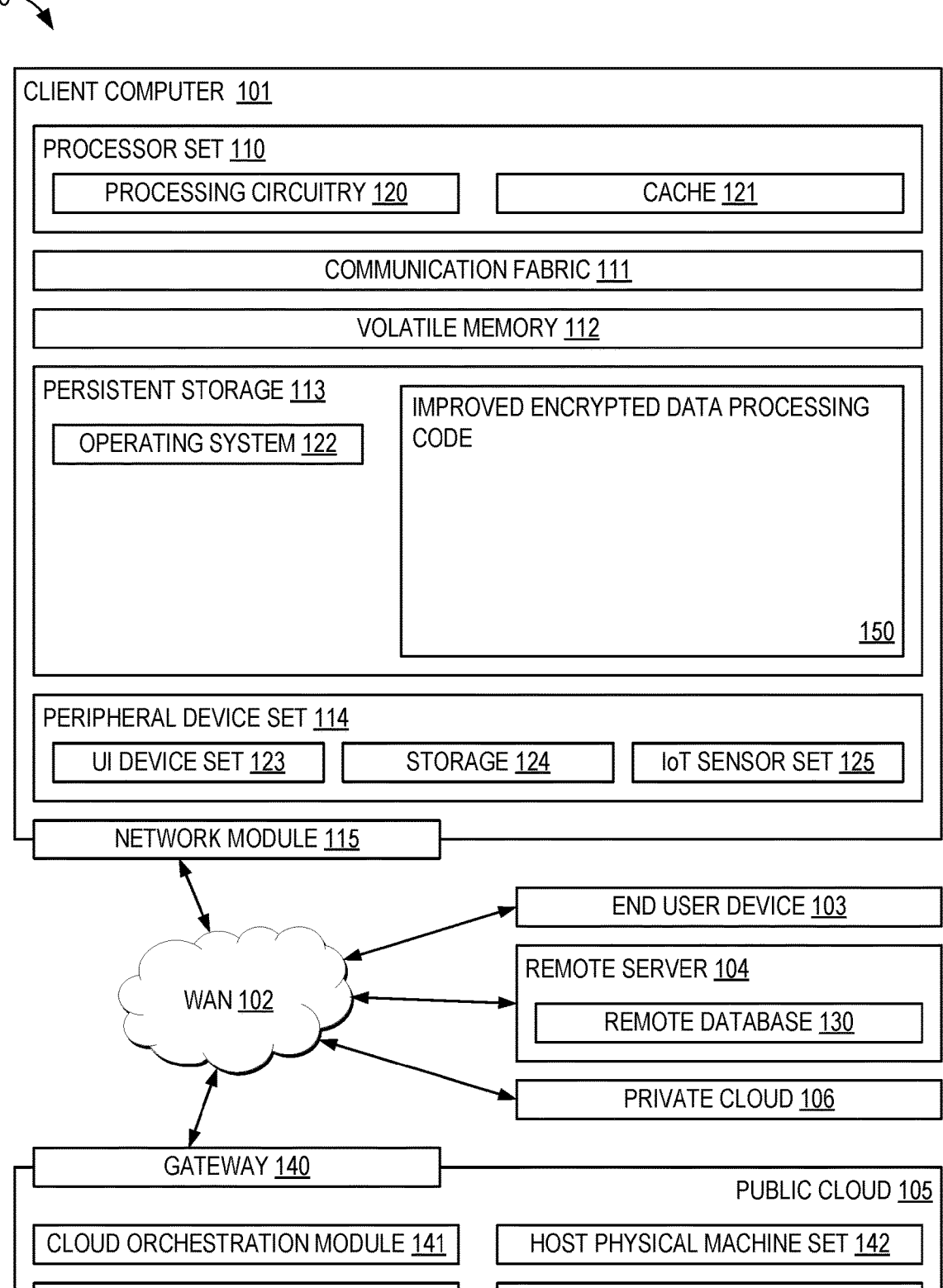

CLIENT COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

IMPROVED ENCRYPTED DATA PROCESSING CODE

150

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

FIG. 1

PROCESSING AND ARCHIVING ENCRYPTED DATA AT SHARED STORAGE LOCATIONS

BACKGROUND

The present invention relates to distributed storage systems, and more specifically, this invention relates to processing and archiving encrypted data at shared data storage locations.

As computing power continues to advance and the use of IoT devices becomes more prevalent, the amount of data produced in systems continues to increase. For instance, the rise of smart enterprise endpoints has led to large amounts of data being generated at remote locations. Data production will only further increase with the growth of 5G networks and an increased number of connected mobile devices.

While cloud computing has been implemented in conventional systems in an effort to improve the ability to process this increasing amount of data, shared processing and/or storage environments can often be accessed by a number of different entities (e.g., users). The use of end-to-end data encryption has increased in an attempt to maintain security of data that is sent across public (non-private) networks and to shared components. For example, data is encrypted before being sent to a shared memory for storage. While encrypting data is effective in securing (hiding) the details of the data itself, it prevents the data from being accessed once it has been sent from the location where the encryption was conducted. Thus, once encrypted data is received at conventional storage, the data is stored in memory as it is received.

Conventional systems thereby suffer from inefficiencies resulting from simply storing encrypted data as it is received. For example, conventional systems have been unable to perform any processing on data that is received due to the encrypted nature of the data. These conventional systems have thereby been forced to decide between inefficient use of data storage space by storing encrypting data as received, or exposing details of the data by not encrypting the data at all. It follows that conventional systems have suffered from operational and performance based inefficiencies.

SUMMARY

A computer-implemented method, according to one embodiment, includes: receiving encrypted data at a storage controller, and providing the encrypted data to a secure software container. The secure software container is configured to decrypt the encrypted data, calculate hash values using the decrypted data, and compress the decrypted data. The secure software container is also configured to re-encrypt the decrypted data. The computer-implemented method also includes receiving a new copy of the encrypted data from the secure software container. The new copy of the encrypted data may be compressed, include hash values calculated at the secure software container, or compressed as well as including hash values. The new copy of the encrypted data received may thereby be stored in memory.

A computer program product, according to another embodiment, includes a computer readable storage medium having program instructions embodied therewith. The program instructions are readable by a storage controller, executable by the storage controller, or readable and executable by the storage controller, to cause the storage controller to: perform the foregoing method.

A system, according to yet another embodiment, includes: storage controller having a secure software container. The system also includes logic that is integrated with the storage controller, executable by the storage controller, or integrated with and executable by the storage controller. Moreover, the logic is configured to: perform the foregoing method.

Other aspects and implementations of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one approach.

DETAILED DESCRIPTION

Figure 2:
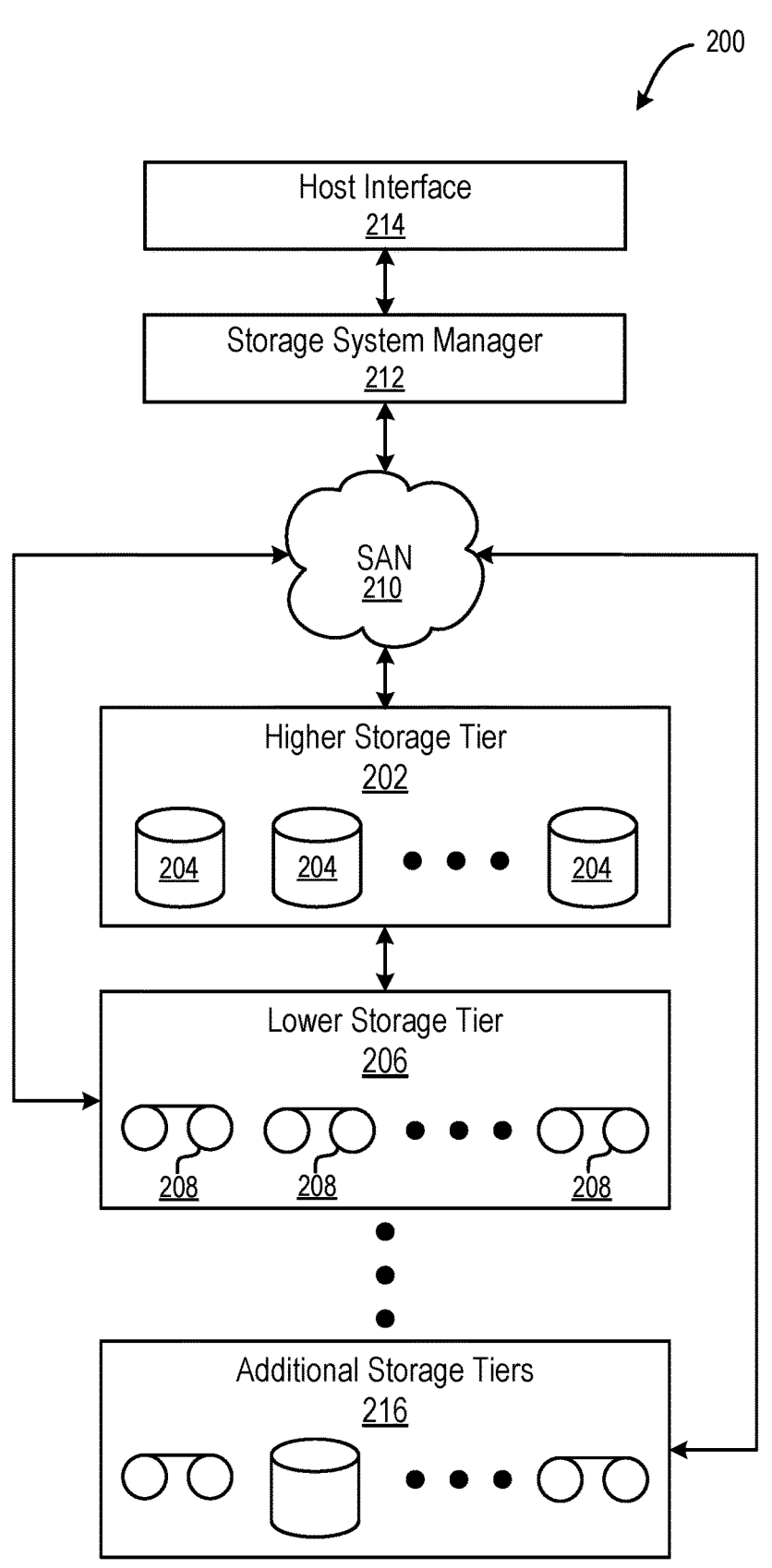
FIG. 2 is a diagram of a tiered data storage system, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for storing encrypted data that is received from various host locations, thereby achieving an efficient and scalable data archive scheme across a distributed system. Implementations herein are able to simultaneously improve storage capacity by enabling compression of encrypted data at a shared storage location, as well as increase compute throughput by performing data deduplication on encrypted data at the shared locations. Accordingly, encrypted data can be stored in memory much more efficiently than has been conventionally achievable, e.g., as will be described in further detail below.

In one general approach, a computer-implemented method includes: receiving encrypted data at a storage controller, and providing the encrypted data to a secure software container. The secure software container is configured to decrypt the encrypted data, calculate hash values using the decrypted data, and compress the decrypted data. The secure software container is also configured to re-encrypt the decrypted data. The computer-implemented method also includes receiving a new copy of the encrypted data from the secure software container. The new copy of the encrypted data may be compressed, include hash values calculated at the secure software container, or compressed as well as including hash values. The new copy of the encrypted data received may thereby be stored in memory.

In another general approach, a computer program product includes a computer readable storage medium having program instructions embodied therewith. The program instructions are readable by a storage controller, executable by the storage controller, or readable and executable by the storage controller, to cause the storage controller to: perform the foregoing method.

In yet another general approach, a system includes: storage controller having a secure software container. The system also includes logic that is integrated with the storage controller, executable by the storage controller, or integrated with and executable by the storage controller. Moreover, the logic is configured to: perform the foregoing method.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product implementation ("CPP implementation" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved encrypted data processing code at block 150 for deduplicating and/or compressing encrypted data processed by a storage controller, thereby achieving the efficiency by which data (particularly encrypted data) is stored in a distributed system. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some implementations, storage 124 may take the form of a quantum computing storage device for storing data in the form of qubits. In implementations where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some implementations, network control functions and network forwarding functions of network module 115 are performed on the same physical hardware device. In other implementations (for example, implementations that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some implementations, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some implementations, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other implementations a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some respects, a system according to various implementations may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various implementations.

Now referring to FIG. 2, a storage system 200 is shown according to one approach. Note that some of the elements shown in FIG. 2 may be implemented as hardware and/or software, according to various approaches. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a storage area network (SAN), as shown in FIG. 2, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the approaches presented herein.

According to some implementations, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

It follows that storage system 200 is able to use different types of memory to implement different levels of performance. For instance, the storage system manager 212 is used to control where data is processed and/or stored in the system 200, where each location is capable of achieving a different performance level (e.g., outcome). Similarly, FIG. 3 below shows a distributed data storage system 300 having different host locations 304, 306, that are connected to a central data storage location 302. Accordingly, data and other information (e.g., commands, instructions, requests, metadata, etc.) can be sent between the host locations 304, 306 and the central data storage location 302, e.g., as described in further detail below.

As noted above, data production has continued to increase as computing power and the use of IoT devices advance. For instance, the rise of smart enterprise endpoints has led to large amounts of data being generated at remote locations. Data production will only further increase with the growth of 5G networks and an increased number of connected mobile devices. This issue has also become more prevalent as the complexity of machine learning models increases. Increasingly complex machine learning models translate to more intense workloads and increased strain associated with applying the models to received data. The operation of conventional implementations has thereby been negatively impacted.

While cloud computing has been implemented in conventional systems in an effort to improve the ability to process this increasing amount of data, shared processing and/or storage environments can often be accessed by a number of different entities (e.g., users). Accordingly, the use of end-to-end data encryption has increased in order to maintain security of data that is sent across public (non-private) networks and to shared components. Host-based encryption is typically applied in situations where data is sent to a shared environment, because host-based encryption ensures that only the originating host has access to the data being encrypted.

For example, data is encrypted before being sent to a shared memory for storage. While encrypting data is effective in securing (hiding) the details of the data itself, it prevents the data from being accessed once it has been sent from the location that encrypted the data. Thus, once encrypted data is received at conventional storage, the data is stored in memory as it is received.

Conventional systems thereby suffer from inefficiencies resulting from simply storing encrypted data as it is received. For example, conventional systems have been unable to perform any processing on data that is received due to the encrypted nature of the data. These conventional systems have thereby been forced to decide between inefficient use of data storage space by storing encrypting data as received, or exposing details of the data by not encrypting the data at all. It follows that conventional systems have suffered from operational and performance based inefficiencies.

In sharp contrast to these conventional shortcomings, implementations herein are able to ensure that encrypted data is stored in memory efficiently. Data that is encrypted at host locations remains accessible, even when sent to a shared storage location, without unintentionally exposing any details of the encrypted data. Implementations herein are thereby able to overcome storage based and processing based issues that have plagued conventional systems, e.g., as will be described in further detail below.

Figure 3:
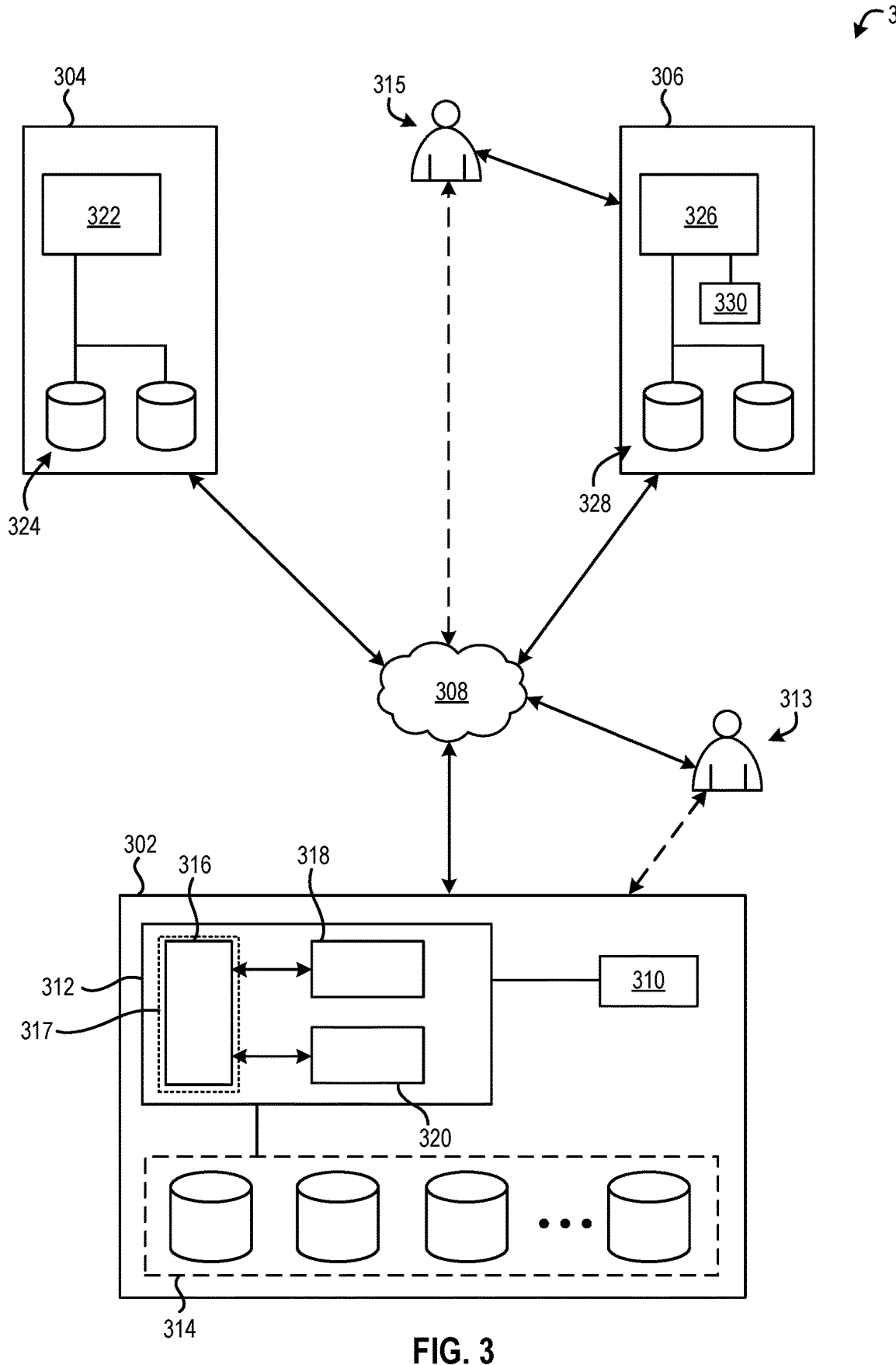
FIG. 3 is a representational view of a distributed system, in accordance with one approach.

Looking now to FIG. 3, a distributed data storage system 300 in accordance with one approach. As an option, the present system 300 may be implemented in conjunction with features from any other approach listed herein, such as those described with reference to the other FIGS., such as FIGS. 1-2. However, this distributed data storage system 300 and others presented herein may be used in various applications and/or in permutations which may or may not be specifically described in the illustrative approaches or implementations listed herein. Further, the system 300 presented herein may be used in any desired environment. Thus FIG. 3 (and the other FIGS.) may be deemed to include any possible permutation.

As shown, the distributed data storage system 300 includes a central data storage location 302 that is connected to host locations 304, 306. Specifically, the central data storage location 302 and host locations 304, 306 are connected to a network 308 that allows for data (e.g., information, commands, requests, instructions, responses, encrypted data, etc.) to be sent between any of the locations 302, 304, 306.

The network 308 may be of any type, e.g., depending on the desired approach. For instance, in some approaches the network 308 is a WAN, e.g., such as the Internet. However, an illustrative list of other network types which network 308 may implement includes, but is not limited to, a LAN, a PSTN, a SAN, an internal telephone network, etc. As a result, any desired information, data, commands, instructions, responses, requests, etc. may be sent between the locations 302, 304, 306, regardless of the amount of separation which exists therebetween, e.g., despite being positioned at different geographical locations.

It should also be noted that the different locations 302, 304, 306 may be connected to each other (and/or other locations) differently depending on the approach. According to an example, two host locations may be located relatively close to each other and connected by a wired connection, e.g., a cable, a fiber-optic link, a wire, etc.; etc., or any other type of connection which would be apparent to one skilled in the art after reading the present description.

With continued reference to FIG. 3, the host locations 304, 306 may have a different configuration than the central data storage location 302. For example, in some implementations the central data storage location 302 includes a large (e.g., robust) storage controller 312 coupled to a cache 310 and memory 314 (also referred to herein as a "data storage array") having a relatively high storage capacity. The central data storage location 302 is thereby able to process and store a relatively large amount of data, allowing it to be connected to, and manage, multiple different host locations. For example, a host location may be a remote edge node that produces a significant amount of user data that is sent to the central data storage location 302 for storage. As noted above, the central data storage location 302 may receive data, commands, etc. from any number of locations. The components included in the central data storage location 302 thereby preferably have a higher storage capacity and throughput than components included in each of the host locations 304, 306 to accommodate the higher flow of data experienced at the central data storage location 302.

It should be noted that with respect to the present description, "data" may include any desired type of information. For instance, in different implementations data can include raw sensor data, metadata, program commands, instructions, etc. Moreover, while implementations herein are described in the context of encrypted data, this is in no way intended to be limiting. Data may also be protected with different types of security features depending on the approach. The way in which data is protected has an impact on how that data may be processed and/or stored. For instance, the storage controller 312 may use a secure software container 316 to process incoming data that is encrypted. Accordingly, the storage controller 312 and/or the secure software container 316 therein may be used to perform one or more operations in method 400 of FIG. 4 below.

With continued reference to FIG. 3, the secure software container 316 may include one or more units of software that are able to package code and the corresponding dependencies, so a corresponding application operates quickly and reliably across different computing environments therein. A software container may also be designed (e.g., custom built) to have certain characteristics and/or functionality. For instance, the secure software container 316 may be used to process encrypted data received at the storage controller 312, as noted above. In some approaches, the secure software container is a plugin-based software package that is modified by a host, and sent to central data storage location 302 for implementation. For instance, the secure software container may be modified to apply one or more encryption and/or decryption keys, add trusted (compliant) hashing algorithm details, etc.

The secure software container 316 is also preferably inaccessible to the storage controller 312. In other words, a logical boundary 317 prevents any other aspects of the storage controller 312 from accessing the secure software container 316 or any data being processed therein. Software being run outside the logical boundary 317 is thereby unable to directly access any data being processed by software running in the secure software container 316.

The ability to insulate the secure software container 316 from exterior access effectively hides any data sent to the secure software container 316. Thus, although the secure software container 316 is located at the central data storage location 302, it may implement confidential details without exposing them to the central data storage location 302 and/or entities connected thereto, e.g., such as administrator 313. According to an example, the secure software container 316 may include one or more private keys configured to encrypt and/or decrypt data according to an encryption standard. The secure software container 316 may thereby be able to decrypt encrypted data and process (e.g., deduplicate and/or compress) the decrypted data without exposing any of the decrypted data and/or private key information to a remainder of the storage controller 312, e.g., as will be described in further detail below. Implementing the secure software container 316 in the storage controller 312 thereby allows for increased storage capacity and reduced compute overhead, while also maintaining strict data security.

While decrypted data may be processed by the secure software container 316, some data processing may be performed by utilizing the capabilities of other components. For instance, a deduplication agent 318 may be used to deduplicate data that has been decrypted in (e.g., by) the secure software container 316. However, this deduplication is again accomplished without exposing any of the decrypted data to the deduplication agent 318 and/or a remainder of the storage controller 312. For instance, hash values may be used to perform the deduplication, thereby keeping the decrypted data secure (e.g., hidden).

Similarly, a compression accelerator 320 may be used to compress data that has been decrypted in (e.g., by) the secure software container 316. As noted above, this compression is accomplished without exposing any of the decrypted data to the compression accelerator 320 and/or a remainder of the storage controller 312. For instance, secure software container 316 may apply the compression accelerator 320 to a virtual function to compress the decrypted data without actually sending the decrypted data directly to the compression accelerator 320 in storage controller 312.

According to an in-use example, which is in no way intended to limit the invention, the storage controller 312 can create and provide a virtual Peripheral Component Interconnect Express (PCIe) function based on virtualisation, e.g., such as single-root input/output virtualization (SR-IOV). SR-IOV is a PCIe extension which lets a PCIe device which is able to split internal resources into isolated PCIe virtual functions. These virtual functions mirror the behavior of hardware equivalents, with the added benefit of delivering traffic directly to a creating entity, e.g., such as a virtual machine or a software container.

Moreover, the PCI function may be assigned to the secure software container 316, such that the secure software container 316 is given secure access to the compression accelerator device 320. The secure software container 316 may thereby expose one or more APIs, through which the storage controller 312 is able to request that a decrypted data block in the secure software container 316 is compressed. The data in the decrypted data block can thereby be compressed without actually exposing any of the decrypted data to the general-purpose (e.g., shared) portion of the storage controller 312.

In some approaches, utilizing the deduplication agent 318 and/or compression accelerator 320 may involve one or more application program interfaces (APIs). For example, the secure software container 316 may expose an API, through which the storage controller 312 can request the hash value of a given data block. In response to receiving this request through the API, the secure software container 316 may internally decrypt the data in the given data block using a set of private keys and calculate a hash value. Accordingly, the hash value may be provided to the storage controller software, which deduplicates the hash value. For instance, the storage controller 312 may compare the hash value against stored hash values which correspond to data already stored in memory 314.

In another example, the secure software container 316 may expose an API, through which the storage controller 312 can request that a given data block be compressed. In response to receiving this request through the API, the secure software container 316 may internally decrypt the data in the given data block using a set of private keys, and send the decrypted data to the compression accelerator 320 to be compressed without exposing the decrypted data, e.g., as described above. The compression accelerator 320 may thereby compress decrypted data that is only partially shared by the secure software container 316 to maintain security of the data. Thereafter, a compressed copy of the decrypted data is returned from the compression accelerator 320 to the secure software container 316. It follows that APIs can be used to accomplish a seamless interaction between opposite sides of the logical boundary 317 while also maintaining security of encrypted data that is decrypted locally at the secure software container 316. APIs may be used to help facilitate the movement and/or representation of data, the flow of a method, etc., as would be appreciated by one skilled in the art after reading the present description.

This logical boundary 317 thereby allows the secure software container 316 to include copies of private keys without exposing them. The private keys may even be used to decrypt data in the secure software container 316, such that the decrypted data may be deduplicated and/or compressed therein, without exposing the decrypted data. This desirably allows data storage systems to further improve storage capacity by reducing data storage utilization, and increasing throughput by removing redundant data, e.g., as will be described in further detail below.

An administrator 313 of the central data storage location 302 and/or storage controller 312 itself is also shown as being connected to network 308 in FIG. 3. In some implementations, the administrator 313 may be directly connected to the central data storage location 302 as represented by the dashed arrowed line. It follows that the administrator 313 may be able to control at least a portion of the central data storage location 302, e.g., such as the compression accelerator 320 and/or deduplication agent 318.

A user 315 is also illustrated as being connected to host location 306. In some approaches, the user 315 connects to the host location 306 through a compute device (e.g., such as the user's personal computer, mobile phone, etc.) such that information can be exchanged therebetween. However, in other approaches the user 315 may be able to access the host location 306 using one or more terminals having a user interface. The user 315 may also be connected to the network 308 in some implementations. Accordingly, the user 315 may access host location 306 and/or other locations in system 300 through the network 308 in such implementations. In still other implementations, the user may be able to access network 308 through a direct connection to the host location 306.

The first host location 304 includes a processor 322 coupled to memory 324. Similarly, host location 306 includes a processor 326 coupled to memory 328. The memory implemented at each of the host locations 304, 306 may be used to store data received from one or more sensors (not shown) in communication with the respective host locations, a user 315 in communication with one or more of the host locations, other ones of the host locations, different systems also connected to network 308, etc.

While the host locations 304, 306 are depicted as including similar components and/or design, it should be noted that each of the host locations 304, 306 may include any desired components which may be implemented in any desired configuration. In some instances, each edge node in a system may be configured differently to provide each location with a different functionality.

According to an example, which is in no way intended to limit the invention, host location 306 includes a cryptographic module 330 connected to the processor 326 that allows the host location 306 to produce encrypted data. The user 315 may provide one or more private keys to the cryptographic module 330 to encrypt data stored in memory 324. In some implementations, the cryptographic module 330 may be synchronized with the secure software container 316 at the central data storage location 302. Accordingly, the cryptographic module 330 and the secure software container 316 may include corresponding private keys configured to encrypt and/or decrypt data according to a private encryption scheme. This allows the cryptographic module 330 at host location 306 to encrypt data and send the encrypted data over network 308 to the central data storage location 302. Upon being received at the central data storage location 302, the encrypted data is decrypted by the secure software container 316 for processing. Moreover, once the decrypted data has been compressed, deduplicated, inspected for security issues (e.g., malware signatures, ransomware signatures, etc.), etc., the secure software container 316 re-encrypts the processed data before the encrypted data is stored in memory 314.

As a result, implementations herein are able to further improve storage capacity by reducing data storage utilization, and increasing throughput by removing redundant data. Looking now to FIG. 4, a method 400 for deduplicating and/or compressing encrypted data received at a storage controller is illustrated in accordance with one approach. Accordingly, the operations of method 400 may be performed continually in the background of an operating system as encrypted data is received over time.

While certain information (e.g., warnings, reports, read requests, etc.) may be issued to a user, it is again noted that the various operations of method 400 can be repeated in an iterative fashion for each instance of new encrypted data received from any of the host locations that are connected to a central data storage location. Thus, method 400 may be performed in accordance with the present invention in any of the environments depicted in FIGS. 1-3, among others, in various approaches. Of course, more or less operations than those specifically described in FIG. 4 may be included in method 400, as would be understood by one of skill in the art upon reading the present descriptions.

Each of the steps of the method 400 may be performed by any suitable component of the operating environment. For example, each of the nodes 401, 402 shown in the flowchart of method 400 may correspond to one or more processors positioned at a different location in a multi-tiered data storage system. Moreover, each of the one or more processors are preferably configured to communicate with each other.

In various implementations, the method 400 may be partially or entirely performed by a controller, a processor, containers, etc., or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 4 includes different nodes 401, 402, each of which represent one or more processors, controllers, containers, computer, etc., positioned at a different location in a storage controller of a distributed data storage system. For instance, node 401 may include one or more processors located in a general-purpose (unsecured)

portion of a storage controller at a central data storage location of a distributed compute system (e.g., see portion of storage controller 312 outside logical boundary 317 of FIG. 3 above). Moreover, node 402 may include one or more processors and/or software containers that are included in a predetermined logical portion of a storage controller (e.g., see secure software container 316 inside logical boundary 317 of FIG. 3 above). In other words, although node 401 and 402 may actually be in a same storage controller, an imaginary logical boundary 403 is shown as separating the two different portions. This logical boundary 403 preferably prevents any information from exchanging between the two portions of the storage controller. Thus, logical boundary 403 blocks node 401 from accessing any information available at node 402, e.g., such as decrypted data, cryptographic keys, specific instructions, etc. Software being run outside the logical boundary 403 is thereby unable to directly access any data being processed by software running at node 402.

Figure 4:
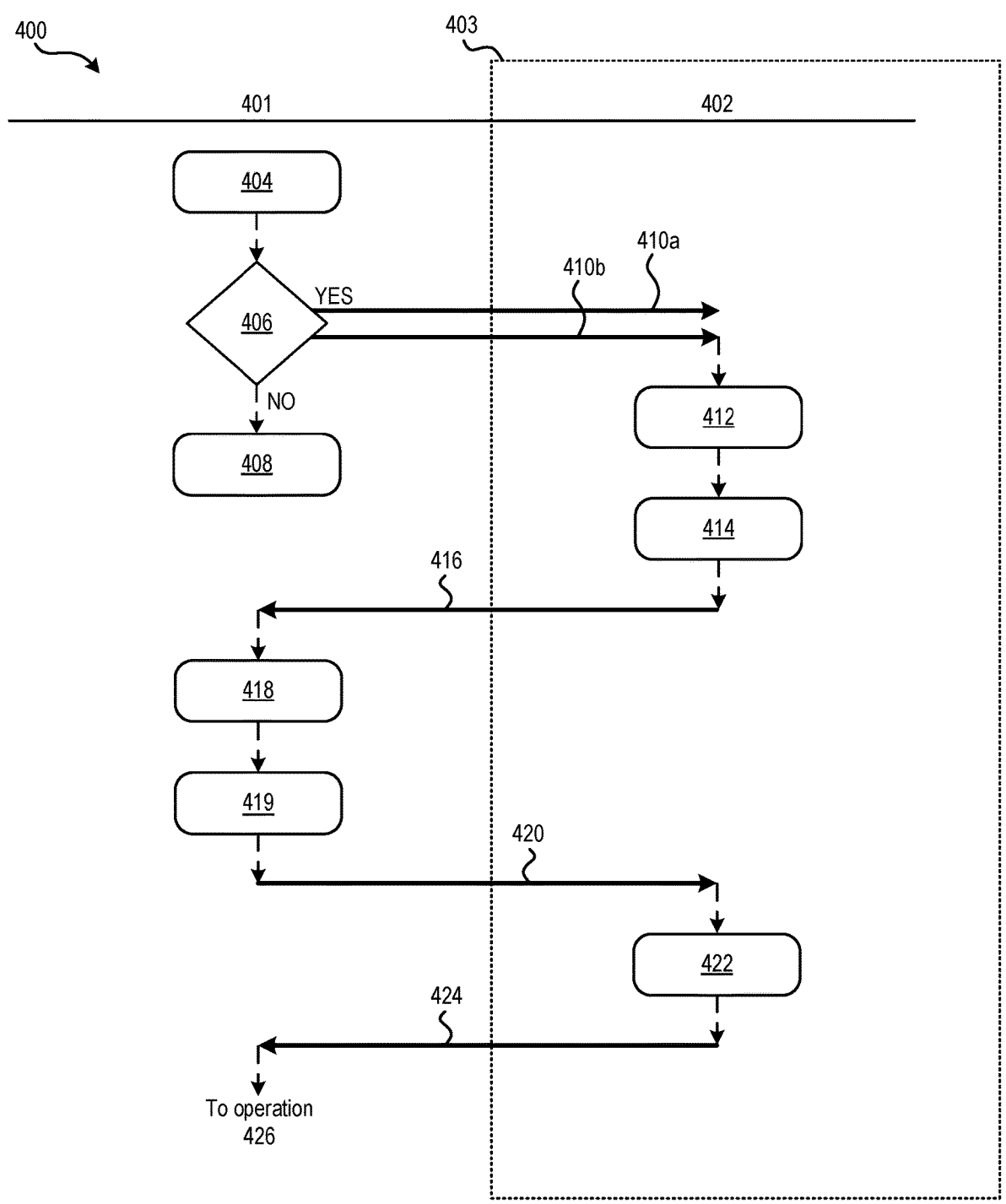
FIG. 4 is a flowchart of a method, in accordance with one approach.
Figure 4:
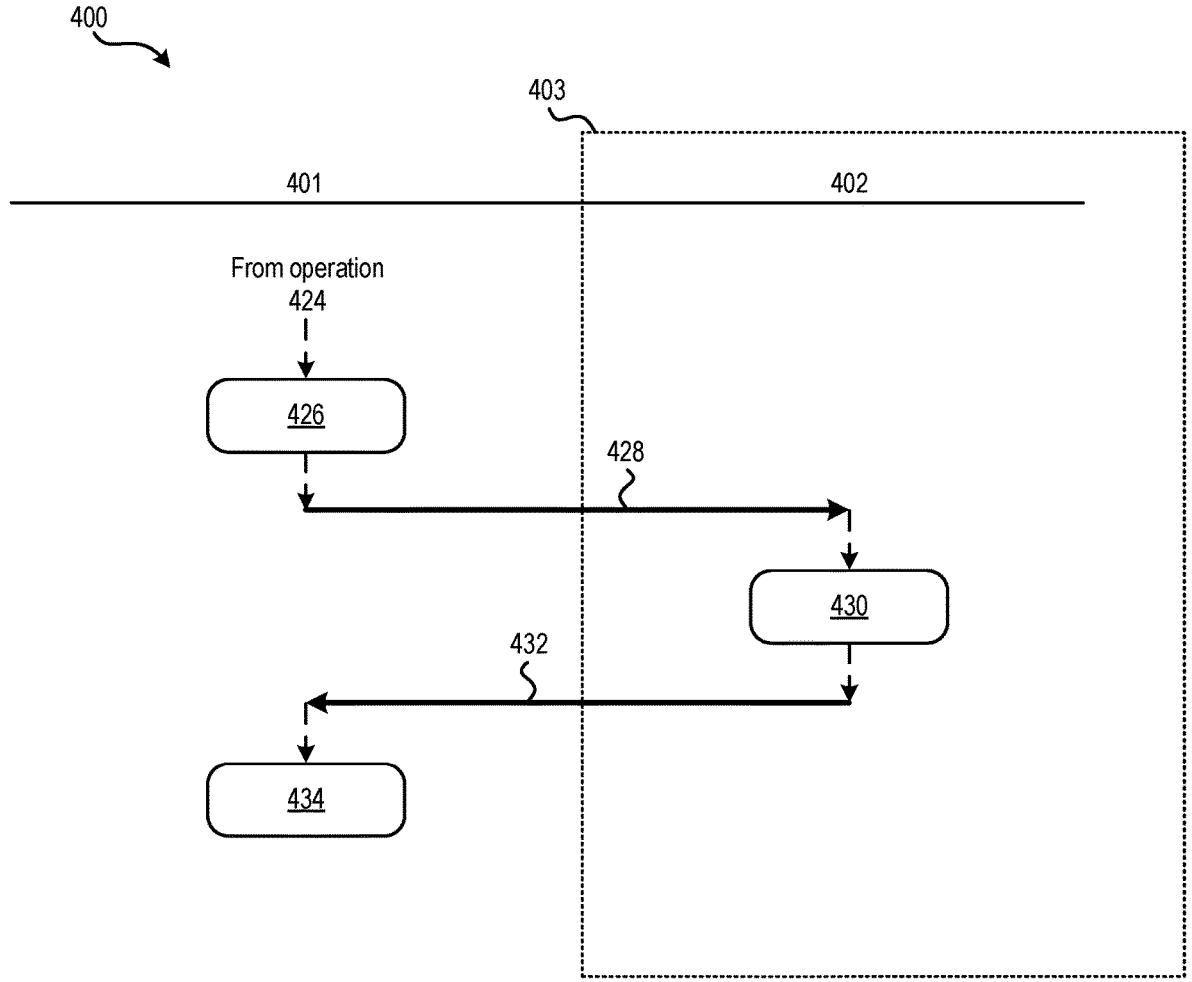

Moreover, it should be noted that the various processes included in method 400 are in no way intended to be limiting, e.g., as would be appreciated by one skilled in the art after reading the present description. For instance, data sent from node 402 to node 401 may be prefaced by a request sent from node 401 to node 402 in some approaches. Additionally, the number of nodes included in FIG. 4 is in no way intended to be limiting. For instance, a second logical boundary may be used to insulate another portion of the storage controller, e.g., such that a second set of cryptographic keys corresponding to a different level of encryption may be implemented.

Looking to FIG. 4, method 400 includes operation 404 which includes receiving data at the storage controller. As noted above, node 401 is located at a central data storage location of a distributed system. Therefore, the data may be received along with instructions to save the data in memory, e.g., as part of a data backup procedure. Additionally, data may be received from one or more different locations in a distributed system over time. For instance, data may be received from one or more running applications, directly from a system administrator, as part of a data migration from another storage system, etc.

The data that is received at node 401 can thereby include both encrypted data and non-encrypted data. While non-encrypted data may be processed nominally, processing encrypted data involves first decrypting the data, e.g., as described in further detail below. Accordingly, operation 406 includes determining the received data is encrypted. The data may thereby be evaluated one block at a time to determine whether each portion has been encrypted.

In response to determining that a present block of data is unencrypted, it is passed from operation 406 along to operation 408. There, operation 408 includes processing the block of non-encrypted data at node 401. Depending on the approach, processing the block of non-encrypted data may include deduplicating the block, compressing the block, comparing the block against known security-based signatures (e.g., ransomware signatures, malware signatures, etc.), etc. Accordingly, a general-purpose (unsecured) portion of a storage controller may be used to process data received that has not been encrypted. It should be noted that, with respect to the present description, a "general-purpose portion" of a storage controller includes any portion (e.g., sub-components) of the storage controller that are not configured to process encrypted data. For example, portions of the storage controller 312 in FIG. 3 outside the logical boundary 317 may be considered the "general-purpose portion" of the storage controller 312.

Returning to operation 406, method 400 proceeds to operation 410a in response to determining that a present block of data is encrypted. There, operation 410a includes sending the encrypted data across logical boundary 403 into node 402. In other words, operation 410a includes sending any encrypted data received at a storage controller, to a secure software container of the storage controller. Operation 406 thereby ensures that blocks of received data determined as including encrypted data are sent to node 402, while blocks determined as not including any encrypted data remain in, and are processed by, a general-purpose portion of the storage controller.

Additional information may be sent to node 402 along with the encrypted data. See operation 410b. As noted above, data may be received at a data storage location along with instructions to store the data in memory. While it is possible to store data as it is received, storage capacity and compute throughput may be significantly improved by performing pre-storage processing on the data. For example, data may be compressed, deduplicated, inspected for malware, etc., before being saved in memory. This conserves storage space and reduces processing overhead associated with storing the data in memory. Accordingly, hash signature data may also be sent from node 401 to a deduplication agent at node 402.

While this data processing is relatively straightforward to do when storing unencrypted data, encrypted data is first decrypted before compression, deduplication, malware inspection, etc., can be performed. However, conventional storage systems have been unable to successfully decrypt encrypted data in shared storage situations without exposing encryption details like the corresponding cryptographic keys. These conventional storage systems have thereby been forced to store encrypted data as it is received, resulting in an inefficient use of storage capacity and a notable increase in compute overhead.

In sharp contrast to these conventional shortcomings, implementations herein are able to process encrypted data before storage, even at a shared data storage location. Again, implementing a portion of a controller that is shielded from being accessed allows for certain details to be implemented without also being available (exposed) to a remainder of the controller and/or any components that are connected thereto. For example, a secure software container may be shielded from any external access. As a result, software and processors external to the secure software container are unable to access any data that is in the secure software container. Cryptographic keys and other private, security based information may thereby be stored and applied in the secure software container, even in situations where the container is implemented at a shared storage controller.

Again, the secure storage container is insulated from any external access, allowing for data to be decrypted in the container without compromising the security of any underlying data. Implementing the secure storage container at a shared storage controller thereby allows for encrypted data to be processed before being stored in memory. For example, encrypted data may be sent to a secure software container to be decrypted, such that the decrypted data may be compressed, deduplicated, checked for malware infections, etc., before being re-encrypted and stored in memory. Implementations herein are thereby able to significantly improve performance. For instance, compressing the decrypted data reduces the resulting size of the re-encrypted copy. Deduplicating the decrypted data reduces the size of the re-encrypted copy, as well as reducing the number of write operations performed when storing the re-encrypted copy.

It follows that a secure storage container may be configured to decrypt and subsequently perform certain operations on data that is received. The additional information sent to node 402 in operation 410*b* along with the encrypted data can identify certain processes to perform on the data once it is decrypted. A user may thereby instruct the storage controller to cause encrypted data to be compressed, deduplicated, inspected, etc., by the secure storage container before being stored in memory. According to an example which is in no way intended to limit the invention, the secure storage container may expose one or more APIs, through which a storage controller can request the desired type of processing is performed on the decrypted data before being stored in memory. The additional information received at node 402 in operation 410*b* may thereby include one or more API entries, each API entry corresponding to a different processing procedure performed on a decrypted copy of the data.

It should be noted that while FIG. 4 illustrates that the encrypted data is deduplicated, compressed, and inspected for security-based signatures before being stored in memory, different processing and/or combinations thereof may be performed on the data, e.g., depending on the inputs that are received. For instance, the additional information received in operation 410*b* may request that certain encrypted data is only compressed, only deduplicated, deduplicated and compared against security-based signatures, etc.

In some approaches, the additional information received in operation 410*b* includes one or more API entries. For example, a secure software container at node 402 may expose one or more APIs, through which the secure software container is able to receive inputs while maintaining security of the data and software that are included therein. A general-purpose portion of a storage controller can thereby submit encrypted data to the secure software container along with inputs to one or more APIs that result in the encrypted data being processed as desired before being stored in memory. Again, this allows for encrypted data to be stored efficiently by reducing the amount of data that is written to memory as well as reducing the number of data operations are performed in total. Both storage capacity and processing power are thereby improved by implementations included herein.

In response to receiving the encrypted data and additional information at node 402, the secure storage container decrypts the encrypted data at operation 412. As noted above, encrypted data can be processed (e.g., compressed, deduplicated, compared, etc.) once it is in decrypted form. Thus, operation 412 may effectively serve as a preliminary operation for the additional processing that is performed on the data in response to it being decrypted.

The process of decrypting the encrypted data typically involves using one or more cryptographic keys. For example, data may be encrypted at a host location using a first public key before being sent over a network to a central data vault. In order to decrypt the encrypted data, the central data vault applies a private key to the encrypted data. However, to avoid exposing this private key from a number of other host locations and other entities that have access to the central data vault, the private key is only implemented in a hardened (protected) location.

Specifically, implementations herein include a secure software container that is insulated by a logical boundary to create a hardened portion of a storage controller. This prevents a remainder of the storage controller and/or the system as a whole from being able to access any details in the container. Accordingly, a general-purpose portion of a storage controller is unable to access any decrypted data in the secure software container. Similarly, software (e.g., operations, predetermined procedures, subroutines, flowcharts, etc.) that is being run in a general-purpose portion of the storage controller is unable to interact with software being performed in the secure software container.

One or more cryptographic keys may thereby be stored in the secure software container, where at least some of the cryptographic keys are private keys. The secure software container may use these cryptographic keys to decrypt and/or re-encrypt data. For instance, encrypted data received for storage may be decrypted in the secure storage container and deduplicated before being re-encrypted and stored in memory without exposing the decrypted data. Accordingly, the secure software container may also be configured to re-encrypt data, e.g., as described in further detail below.

With continued reference to FIG. 4, method 400 proceeds from operation 412 to operation 414 in response to decrypting the encrypted data received at node 402. There, operation 414 includes beginning to process the decrypted data. In the embodiment depicted, operation 414 includes calculating hash values of the decrypted data produced at operation 412. Accordingly, operation 414 effectively initiates a deduplication procedure that is triggered in response to receiving API entry requesting the data is deduplicated. It follows that in implementations where deduplication is not requested, different ones of the operations in method 400 may be performed in response to decrypting the encrypted data at operation 412. In other implementations, the data may be deduplicated after being compressed.

Referring still to operation 414, a hash value may be calculated for each block (e.g., segment) of the decrypted data. However, the decrypted data may be divided into segments of any desired size depending on the approach. Thus, although implementations herein are described in the context of data blocks, this is in no way intended to be limiting. Rather, "data block" may refer to any desired segment of data. For instance, a data encryption level may impact the type of hash calculations that can be performed on certain subsets of the data.

The hash values calculated for the decrypted data are returned to node 401 in operation 416. Returning the hash values to node 401 allows for them to be compared against data that is already stored in memory. Accordingly, operation 418 includes comparing the received hash values to a list of hash values that correspond to data already stored in memory. This allows for the storage controller to identify portions of data already stored in memory that match incoming data. Matching copies of incoming data may thereby be replaced with a pointer that points to the existing copy of the same data in memory.

In some approaches, the hash values are sent to a deduplication agent at node 401. The deduplication agent may be implemented in a storage controller such that the hash values received can easily be compared against other hash values. In some approaches, the deduplication agent maintains a list of hash values that represent the data currently in memory. It should also be noted that the hash values are preferably returned from node 402 to node 401 without exposing any details of the decrypted data that correspond thereto. It follows that using certain types of hash values that avoid exposing information about the data they represent are preferred.

Operation 418 also preferably keeps track of which hash values are identified as corresponding to duplicate data, and which hash values are determined as representing new data. These results are collected as the hash values are evaluated, and returned to node 402 at operation 420. However, the hash values may be used to perform additional evaluations of the corresponding data while decrypted. For instance, optional operation 419 includes comparing the hash values calculated in operation 414 to a list of hash values that correspond to undesirable data.

In some approaches, optional operation 419 includes comparing the hash values calculated in operation 414 to a list of known ransomware signatures. However, the hash values may be compared against any desired security-based signatures. For instance, in some approaches the hash values are compared against malware signatures to avoid a malware infection (or similar types of security-based infections) at a shared storage location.

Hash values identified as matching one or more entries in the list of known ransomware signatures may thereby be identified as security threats to the system. A data block corresponding to a hash value determined as matching a known ransomware signature is preferably flagged and handled differently than a remainder of the data blocks. For instance, a data block identified as likely including ransomware may be actively prevented from being transmitted and/or stored in memory. Accordingly, instructions may be sent along with the deduplication results in operation 420 to prevent some of the data blocks from being transmitted and/or stored in the memory. In some approaches, any data in an identified data block may be deleted to reduce the chance of ransomware infection. In other approaches, identified data blocks may be sent to a security vault, flagged for additional review, removed from the secure software container, etc.

It follows that results of performing the comparison in optional operation 419 are returned to node 402 along with the deduplication results in operation 420. The deduplication results received from node 401 in operation 420 are thereby applied by the secure software container at node 402. See operation 422. Similarly, operation 422 may include actively preventing one or more data blocks identified as likely including ransomware from being transmitted and/or stored in memory.

Indications may thereby be received from the storage controller at node 401 for each of the data blocks. The indicators preferably identify how each of the different data blocks should be processed by identifying data duplicates and/or security threats. For instance, the indicators may identify duplicate data blocks as well as data blocks that likely contain ransomware. These indications may further be used to identify new data and signal instances where redundant data should be replaced with pointers.

Accordingly, a data block may be identified as including new data in response to receiving an indication from the storage controller that the hash value corresponding to the data block is not a duplicate. The new data in this data block is preferably maintained such that it may be transferred to (stored in) memory. However, a data block identified by the storage controller as including duplicate data is preferably replaced with a pointer to the existing duplicate data. The data block may thereby be replaced with a pointer that points to a data block in memory, e.g., as would be appreciated by one skilled in the art after reading the present description.

It follows that operation 422 includes forming a second copy of the decrypted data, where the second copy includes (i) data blocks having decrypted data that is new, and (ii) pointers to existing data in memory. The second copy of the decrypted data thereby has redundant data removed. Data blocks identified as including ransomware are also preferably removed. However, it should be noted that in some instances, pointers replacing encrypted data may only be directed to other encrypted data in memory. This prevents the pointers from divulging any cryptographic details from a duplicate copy of unencrypted data, e.g., as would be appreciated by one skilled in the art after reading the present description.

The hash values calculated in operation 414 may also be used to perform additional operations in some implementations. For instance, the hash values calculated for data blocks may be compared against other predetermined lists to determine whether incoming data matches any known information. For example, the hash values calculated in operation 414 may be compared against a list of known ransomware signatures to identify any matches, e.g., as described above at operation 419.

While method 400 is shown as proceeding to operation 424 from operation 422, it should again be noted that the secure software container may only receive an indication to deduplicate the encrypted data. Thus, in some implementations the decrypted data that is deduplicated at operation 422 may be re-encrypted and sent back to node 401. In other words, the second copy of the decrypted data which includes (i) data blocks having decrypted data that is new, and (ii) pointers to existing data in memory may be re-encrypted and returned to node 401 for storage in memory. For example, some types of data may not be compressible and therefore no API input may have been received indicating to compress the deduplicated data at operation 422.

However, proceeding now to operation 424, there method 400 includes requesting that the hash values continuing to process the decrypted data. Operation 424 effectively initiates a compression procedure that is triggered in response to receiving an API entry requesting the data to be compressed before being stored in memory. It follows that in implementations where compression is not requested, different ones of the operations in method 400 may be performed in response to deduplicating the decrypted data in operation 422.

With continued reference to FIG. 4, operation 424 includes sending the decrypted and deduplicated data from operation 422 to node 401. In some approaches, the decrypted and deduplicated data is sent to a compression accelerator adapter in the storage controller. The compression accelerator adapter is preferably able to compress the decrypted and deduplicated data without exposing any details of the decrypted data. For instance, in some approaches the compression accelerator adapter may be a virtual function that interfaces with the secure software container. As a result, the secure software container may have direct access to the compression accelerator adapter without a remainder of the general-purpose portion of the storage controller having access to any data processed by the compression accelerator adapter, e.g., as would be appreciated by one skilled in the art after reading the present description.

The decrypted and deduplicated data is thereby compressed. See operation 426. The process of compressing the decrypted data at operation 426 may be accomplished differently depending on the type of data (e.g., the amount by which the data can be compressed), the type of compression scheme implemented, etc. Accordingly, the compression implemented in operation 426 may depend on the type of data received, user input, previous compression results, etc. However, it should again be noted that none of the decrypted data is exposed as a result of the compression. In other words, although the deduplicated decrypted data may be shared with a compression accelerator adapter in a general-purpose portion of a storage controller, the decrypted data is not exposed (e.g., visible) to the general-purpose portion of a storage controller. Again, the compression accelerator adapter may be implemented as a virtual function to compress the decrypted data at operation 426.

From operation 426, the compressed and deduplicated decrypted data is returned to node 402. See operation 428. Accordingly, a deduplication agent in a storage controller determines whether certain data should be stored. Moreover, operation 430 includes re-encrypting the compressed and deduplicated decrypted data at node 402. In some approaches operation 430 includes encrypting the data using a same encryption procedure as was used to form the encrypted data received at operation 404. This may desirably maintain an intended final form of the data before being stored in memory. However, any desired encryption algorithms may be implemented to perform the re-encryption. It should also be noted that performing operations 414 through 422 effectively equates to the decrypted data being deduplicated. Moreover, performing operations 424 through 428 effectively equates to the decrypted data being compressed.

From operation 430, method 400 proceeds to operation 432, where the re-encrypted data is returned to node 401. Accordingly, node 401 receives a different (e.g., "new") copy of encrypted data than was originally received at operation 404. As noted above, the new copy of encrypted data received at node 401 as a result of operation 432 may have been deduplicated, compressed, verified as not including ransomware, etc. The new copy of encrypted data received at operation 432 may thereby be a different size than the encrypted data received at operation 404. In other implementations, the new copy of encrypted data may correspond to fewer data writes and/or not include ransomware.

In response to receiving the re-encrypted new copy of data at operation 432, operation 434 includes causing the new copy of data to be stored in memory.

It follows that operations of method 400 are able to simultaneously improve storage capacity by enabling compression of encrypted data at a shared storage location, as well as increase compute throughput by performing data deduplication on encrypted data at the shared locations. Accordingly, implementations herein are able to ensure that encrypted data is stored in memory efficiently. Data that is encrypted at host locations remains accessible, even when sent to a shared storage location, without unintentionally exposing any details of the encrypted data. Implementations herein are thereby able to overcome storage based and processing based issues that have plagued conventional systems.

Certain aspects of the implementations described herein may further be improved as a result of implementing one or more machine learning models. These machine learning models may be trained to generate at least some of the ransomware signatures and/or other security based information that is compared against hash values of the decrypted data. For instance, a machine learning model (e.g., a neural network) may be trained using labeled and/or unlabeled data corresponding to past performance of a distributed system implementing any of the processes described herein. Over time, the machine learning model may thereby be able to identify security threats and breaches that occur in a system and/or other systems. This understanding will allow the machine learning model to identify various security vulnerabilities which can be characterized and compared against incoming data to avoid additional issues occurring. The machine learning model may achieve this by balancing the importance of incoming data, with the security threat determined based on past performance, e.g., as would be appreciated by one skilled in the art after reading the present description.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving encrypted data at a storage controller;
   providing the encrypted data to a secure software container configured to:
   decrypt the encrypted data,
   calculate hash values using the decrypted data,
   compress the decrypted data, and
   re-encrypt the decrypted data;
   receiving a new copy of the encrypted data from the secure software container, wherein the new copy of the encrypted data is compressed, includes hash values, or is compressed and includes hash values; and
   causing the new copy of the encrypted data to be stored in memory,
   wherein the storage controller is unable to access the decrypted data in the secure software container.

2. The computer-implemented method of claim 1, wherein the secure software container includes one or more cryptographic keys configured to decrypt, encrypt, or decrypt and encrypt data, wherein the storage controller is unable to access the cryptographic keys in the secure software container.

3. The computer-implemented method of claim 1, wherein the secure software container is configured to assist with deduplicating the decrypted data by, for each block of the decrypted data:
   calculating a hash value of a respective decrypted data block;
   returning the hash value to the storage controller;
   in response to receiving an indication from the storage controller that the hash value is not a duplicate, maintaining the respective decrypted data block in the new copy of the encrypted data; and
   in response to receiving an indication from the storage controller that the hash value is a duplicate, replacing the respective decrypted data block with a pointer in the new copy of the encrypted data.

4. The computer-implemented method of claim 3, wherein the hash value is returned from the secure software container to a deduplication agent of the storage controller without exposing the decrypted data.

5. The computer-implemented method of claim 3, comprising:

re-encrypting the decrypted data by encrypting data
blocks and pointers in the new copy of the encrypted
data.

6. The computer-implemented method of claim 3, comprising:
comparing the hash values received from the secure
software container to a list of known ransomware
signatures; and
in response to identifying a match between the hash
values and the list of known ransomware signatures,
sending instructions to prevent the corresponding
decrypted data block from being stored in the memory.

7. The computer-implemented method of claim 1,
wherein the secure software container is configured to
compress the decrypted data by, for each block of the
decrypted data:
sending the respective decrypted data block to a compression accelerator; and
receiving a compressed copy of the respective decrypted
data block,
wherein re-encrypting the decrypted data includes encrypting the compressed copies of the decrypted data blocks.

8. The computer-implemented method of claim 7,
wherein the storage controller is unable to access the
decrypted data blocks or the compressed copies of the
decrypted data blocks from the compression accelerator.

9. A computer program product, comprising a computer
readable storage medium having program instructions
embodied therewith, the program instructions readable by a
storage controller, executable by the storage controller, or
readable and executable by the storage controller, to cause
the storage controller to:
receive encrypted data;
provide the encrypted data to a secure software container
configured to:
decrypt the encrypted data,
calculate hash values using the decrypted data,
compress the decrypted data, and
re-encrypt the decrypted data;
receive a new copy of the encrypted data from the secure
software container, wherein the new copy of the
encrypted data is compressed, includes hash values, or
is compressed and includes hash values; and
cause the new copy of the encrypted data to be stored in
memory,
wherein the storage controller is unable to access the
decrypted data in the secure software container.

10. The computer program product of claim 9, wherein
the secure software container includes one or more cryptographic keys configured to decrypt, encrypt, or decrypt and
encrypt data, wherein the storage controller is unable to
access the cryptographic keys in the secure software container.

11. The computer program product of claim 9, wherein the
secure software container is configured to assist with deduplicating the decrypted data by, for each block of the
decrypted data:
calculating a hash value of the respective decrypted data
block;
returning the hash value to the storage controller;
in response to receiving an indication from the storage
controller that the hash value is not a duplicate, maintaining the respective decrypted data block in the new
copy of the encrypted data; and
in response to receiving an indication from the storage
controller that the hash value is a duplicate, replacing the respective decrypted data block with a pointer in the
new copy of the encrypted data.

12. The computer program product of claim 11, wherein
the hash value is returned to a deduplication agent of the
storage controller.

13. The computer program product of claim 11, comprising:
re-encrypting the decrypted data by: encrypting data
blocks and pointers in the new copy of the encrypted
data.

14. The computer program product of claim 11, wherein
the program instructions are readable and/or executable by
the storage controller to cause the storage controller to:
compare the hash values received from the secure software container to a list of known ransomware signatures; and
in response to identifying a match between the hash
values and the list of known ransomware signatures,
send instructions to prevent the corresponding
decrypted data block from being stored in the memory.

15. The computer program product of claim 9, wherein
the secure software container is configured to compress the
decrypted data by, for each block of the decrypted data:
sending the respective decrypted data block to a compression accelerator; and
receiving a compressed copy of the respective decrypted
data block,
wherein re-encrypting the decrypted data includes encrypting the compressed copies of the decrypted data blocks.

16. The computer program product of claim 15, wherein
the storage controller is unable to access the decrypted data
blocks or the compressed copies of the decrypted data
blocks from the compression accelerator.

17. A system, comprising:
storage controller having a secure software container; and
logic integrated with the storage controller, executable by
the storage controller, or integrated with and executable
by the storage controller, the logic being configured to:
receive encrypted data;
provide the encrypted data to a secure software container configured to:
decrypt the encrypted data,
calculate hash values using the decrypted data,
compress the decrypted data, and
re-encrypt the decrypted data;
receive a new copy of the encrypted data from the
secure software container, wherein the new copy of
the encrypted data is compressed, includes hash
values, or is compressed and includes hash values;
and
cause the new copy of the encrypted data to be stored
in memory,
wherein the storage controller is unable to access the
decrypted data in the secure software container.

18. The system of claim 17, wherein the secure software
container is a plugin-based software package that has been
modified by a host, and implemented in the storage controller, wherein software running in the storage controller, but
outside the secure software container, is unable to directly
access data being processed by software running in the
secure software container.

19. The computer-implemented method of claim 7, further comprising:
causing the secure software container to compress the
decrypted data by submitting a request through an
application program interface (API) exposed by the
secure software container, wherein the storage controller is unable to access the decrypted data blocks or the compressed copies of the decrypted data blocks from the compression accelerator.

20. The computer-implemented method of claim 19, wherein software running in the storage controller, but outside the secure software container, is unable to directly access data being processed by software running in the secure software container.

* * * * *